(12) United States Patent
Alkeskjold

(10) Patent No.: US 8,903,214 B2
(45) Date of Patent: Dec. 2, 2014

(54) LARGE CORE AREA SINGLE MODE OPTICAL FIBER

(75) Inventor: Thomas Tanggaard Alkeskjold, Jyllinge (DK)

(73) Assignee: NKT Photonics A/S, Birkerod (DK)

( * ) Notice: Subject to any disclaimer, the term of this patent is extended or adjusted under 35 U.S.C. 154(b) by 22 days.

(21) Appl. No.: 13/805,869

(22) PCT Filed: Jun. 27, 2011

(86) PCT No.: PCT/DK2011/050242
§ 371 (c)(1),
(2), (4) Date: Jan. 17, 2013

(87) PCT Pub. No.: WO2011/160646
PCT Pub. Date: Dec. 29, 2011

(65) Prior Publication Data
US 2013/0114129 A1    May 9, 2013

Related U.S. Application Data

(60) Provisional application No. 61/358,709, filed on Jun. 25, 2010.

(51) Int. Cl.
```
G02B 6/02      (2006.01)
H01S 3/067     (2006.01)
C03B 37/012    (2006.01)
G02B 6/028     (2006.01)
H01S 3/08      (2006.01)
H01S 3/094     (2006.01)
```

(52) U.S. Cl.
CPC ......... *H01S 3/06754* (2013.01); *C03B 37/0122* (2013.01); *G02B 6/02019* (2013.01); *G02B 6/0283* (2013.01); *G02B 6/02338* (2013.01); *H01S 3/08045* (2013.01); *C03B 2203/23* (2013.01); *G02B 6/02361* (2013.01); *H01S 3/094007* (2013.01); *G02B 6/02357* (2013.01); *C03B 2203/14* (2013.01); *G02B 6/02333* (2013.01); *H01S 3/06733* (2013.01); *C03B 2203/29* (2013.01); *C03B 2203/28* (2013.01); *C03B 2201/34* (2013.01); *G02B 6/02352* (2013.01); *H01S 3/06741* (2013.01); *C03B 2203/12* (2013.01)
USPC .......... 385/126; 385/125; 359/341.1; 65/393; 65/409; 65/411

(58) Field of Classification Search
CPC ............ H01S 3/06741; H01S 3/06737; H01S 3/06729; G02B 6/02347; G02B 6/02357; G02B 6/02361; G02B 6/02352
See application file for complete search history.

(56) References Cited

U.S. PATENT DOCUMENTS 5,278,850 A * 1/1994 Ainslie et al. .................. 372/6
5,471,553 A * 11/1995 Teshima ......................... 385/125

(Continued)

FOREIGN PATENT DOCUMENTS

| WO | 01/31376 A1 | 5/2001 |
| WO | 02/088801 A2 | 11/2002 |

(Continued)

OTHER PUBLICATIONS

Kuhlmey et al., "Photonics crystal fibres with resonant coatings", Physica B, vol. 394, 2007, pp. 155-158.

(Continued)

*Primary Examiner* — Ari M Diacou
(74) *Attorney, Agent, or Firm* — Buchanan Ingersoll & Rooney P.C.

(57) ABSTRACT

A single-mode optical fiber for guiding an optical signal, wherein the core region is capable of guiding an optical signal in a fundamental core mode at an optical signal wavelength. A cladding region is arranged to surround the core region and includes an inner cladding region and an outer cladding region. The inner cladding region includes a background material and a plurality of inner cladding features arranged in the background material, wherein a plurality of the plurality of inner cladding features are of a first type of feature that includes an air hole surrounded by a high-index region comprising a high-index material that is larger than the refractive index of the inner cladding background material.

17 Claims, 13 Drawing Sheets

(56) References Cited

U.S. PATENT DOCUMENTS

| | | | |
|---|---|---|---|
| 5,802,236 A * | 9/1998 | DiGiovanni et al. | 385/127 |
| 5,907,652 A * | 5/1999 | DiGiovanni et al. | 385/125 |
| 6,243,522 B1 * | 6/2001 | Allan et al. | 385/123 |
| 6,301,421 B1 * | 10/2001 | Wickham et al. | 385/126 |
| 6,334,017 B1 * | 12/2001 | West | 385/123 |
| 6,334,019 B1 * | 12/2001 | Birks et al. | 385/125 |
| 6,404,966 B1 * | 6/2002 | Kawanishi et al. | 385/125 |
| 6,418,258 B1 * | 7/2002 | Wang | 385/125 |
| 6,444,133 B1 * | 9/2002 | Fajardo et al. | 216/24 |
| 6,539,155 B1 * | 3/2003 | Broeng et al. | 385/125 |
| 6,567,164 B2 * | 5/2003 | Birk et al. | 356/317 |
| 6,636,677 B2 * | 10/2003 | Hasegawa et al. | 385/127 |
| 6,661,957 B1 * | 12/2003 | Levenson et al. | 385/125 |
| 6,788,862 B2 * | 9/2004 | Aitken et al. | 385/122 |
| 6,845,203 B1 * | 1/2005 | Levenson | 385/125 |
| 6,859,598 B2 * | 2/2005 | Hasegawa et al. | 385/127 |
| 7,054,513 B2 * | 5/2006 | Herz et al. | 385/12 |
| 7,106,933 B2 * | 9/2006 | Han | 385/125 |
| 7,289,709 B2 * | 10/2007 | Folkenberg et al. | 385/126 |
| 7,340,140 B1 | 3/2008 | Xu et al. | |
| 2001/0028775 A1 * | 10/2001 | Hasegawa et al. | 385/127 |
| 2001/0029756 A1 * | 10/2001 | Paek et al. | 65/395 |
| 2002/0031319 A1 * | 3/2002 | Wang | 385/125 |
| 2002/0061176 A1 * | 5/2002 | Libori et al. | 385/125 |
| 2002/0110340 A1 * | 8/2002 | Kamel et al. | 385/125 |
| 2002/0131742 A1 * | 9/2002 | Bayart et al. | 385/125 |
| 2003/0056550 A1 * | 3/2003 | Tanaka et al. | 65/428 |
| 2003/0174986 A1 * | 9/2003 | Forbes et al. | 385/125 |
| 2003/0180018 A1 * | 9/2003 | Hasegawa | 385/125 |
| 2004/0011082 A1 * | 1/2004 | Paek et al. | 65/489 |
| 2004/0013377 A1 * | 1/2004 | Han | 385/125 |
| 2004/0033043 A1 * | 2/2004 | Monro et al. | 385/125 |
| 2004/0071423 A1 * | 4/2004 | Libori et al. | 385/127 |
| 2004/0086247 A1 * | 5/2004 | Wang et al. | 385/125 |
| 2004/0096173 A1 * | 5/2004 | Fekety et al. | 385/125 |
| 2004/0105641 A1 * | 6/2004 | Russell et al. | 385/125 |
| 2004/0175085 A1 * | 9/2004 | Forbes et al. | 385/125 |
| 2004/0228592 A1 * | 11/2004 | Gaeta et al. | 385/125 |
| 2005/0036752 A1 * | 2/2005 | Burke et al. | 385/125 |
| 2005/0111805 A1 * | 5/2005 | Hertz et al. | 385/125 |
| 2005/0152655 A1 | 7/2005 | Sunagawa | |
| 2005/0226578 A1 * | 10/2005 | Mangan et al. | 385/125 |
| 2006/0010921 A1 * | 1/2006 | Mori et al. | 65/393 |
| 2006/0193582 A1 * | 8/2006 | Ouderkirk et al. | 385/126 |
| 2006/0263022 A1 * | 11/2006 | Han | 385/123 |
| 2006/0291789 A1 * | 12/2006 | Folkenberg et al. | 385/123 |
| 2009/0046984 A1 * | 2/2009 | Mukasa | 385/125 |
| 2009/0201953 A1 * | 8/2009 | Peyghambarian et al. | 372/6 |
| 2010/0226614 A1 * | 9/2010 | Quiquempois et al. | 385/122 |
| 2010/0266251 A1 * | 10/2010 | Lyngso et al. | 385/125 |
| 2011/0141757 A1 * | 6/2011 | Taru et al. | 362/551 |

FOREIGN PATENT DOCUMENTS

| | | |
|---|---|---|
| WO | 03/078338 A2 | 9/2003 |
| WO | 2004/053550 A1 | 6/2004 |
| WO | 2010/060435 A1 | 6/2010 |

OTHER PUBLICATIONS

Kim et al., "New defect design in index guiding holey fiber for uniform birefringence and negative flat dispersion over a wide spectral range", Optics Express, vol. 13, No. 13, Aug. 8, 2005, pp. 6039-6050.

Supplementary European Search Report dated Sep. 5, 2014 issued in the corresponding European Patent Application No. 11797636.5 (7 pages).

J. Limpert et al., "Low-Nonlinearity Single-Transverse-Mode Ytterbium-Doped Photonic Crystal Fiber Amplifier", Optics Express, OSA (Optical Society of America), Washington, DC, Apr. 1, 2004, pp. 1313-1319, vol. 12, No. 7, XP002346510, ISSN: 1094-4087, DOI: 10.1364/OPEX.12.001313 (7 pages).

Pier J.A. Sazio et al., "Microstructured Optical Fibers as High-Pressure Microfluidic Reactors", Science, American Association for the Advancement of Science, US, Mar. 17, 2006, pp. 1583-1586, vol. 311, XP007906149, ISSN: 0036-8075, DOI: 10.1126/SCIENCE.1124281 (4 pages).

* cited by examiner

LARGE CORE AREA SINGLE MODE OPTICAL FIBER

The invention relates to a large core area single mode optical fiber comprising a microstructure comprising air holes surrounded by high-index regions, and a method of their production as well as various applications of such fibers, such as for amplification of an optical signal.

Single mode optical fibers and their applications are well known in the art. In one configuration, the single mode core is surrounded by a cladding region capable of guiding a pump light for optically pumping active elements comprised in the fiber material.

Various embodiments of the inventions are described in the following sections.

One object of the invention is to provide a single-mode optical fiber for guiding an optical signal, said optical fiber having a longitudinal, optical axis and a cross section perpendicular thereto, said optical fiber comprising a core region and a cladding region. The core region is capable of guiding an optical signal in a fundamental core mode with an effective refractive index, $n_c$, at an optical signal wavelength, $\lambda_1$. The cladding region is arranged to surround the core region and comprises an inner cladding region and an outer cladding region. The inner cladding region comprises a background material having a refractive index, $n_b$, and a plurality of inner cladding features arranged in said background material, wherein at least a plurality of said plurality of inner cladding features are of a first type of feature. The first type of feature comprises an air hole surrounded by a high-index region comprising a high-index material having a refractive index, $n_r$, that is larger than the refractive index of the inner cladding background material. The plurality of the first type of feature supports an optical mode with an effective refractive index, $n_1$, which is lower than or equal to the effective refractive index of the fundamental core mode at said optical signal wavelength One object of the invention is to provide a single-mode cladding pumped optical fiber for amplifying an optical signal, said optical fiber having a longitudinal, optical axis and a cross section perpendicular thereto. The optical fiber comprises a core region and a cladding region. The core region comprises a material doped with at least one active element and is capable of guiding an optical signal in a fundamental core mode with an effective refractive index, $n_c$, at an optical signal wavelength, $\lambda_1$. The cladding region surrounds the core region, and comprises an inner cladding region capable of guiding a pump signal at a pump wavelength, $\lambda_p$, and an outer cladding region. The inner cladding region comprises a background material having a refractive index, $n_b$, and a plurality of inner cladding features arranged in said background material. At least a plurality of said plurality of inner cladding features is of a first type of feature, said first type of feature comprising an air hole surrounded by a high-index region comprising a high-index material having a refractive index, $n_r$, that is larger than the refractive index of the inner cladding background material, $n_b$. The plurality of the first type of feature supports an optical mode with an effective refractive index, $n_1$, which is lower than or equal to the effective refractive index of the fundamental core mode at said optical signal wavelength In the context of the present invention, the phrase "high-index" used in relation to the phrases "high-index region" and "high-index material" refers to a refractive index which is higher than the refractive index of the inner cladding background material.

In the context of the present invention, the phrase "inner cladding background material" refers to a single material or materials having substantially the same refractive index, which constitutes the majority of the inner cladding as measured by the fraction of a cross sectional area of the inner cladding region that is made of by this particular material, such as at least 50% of the area, such as at least 60% of the area, such as at least 70% of the area, such as at least 80% of the area, such as at least 90% of the area, such as at least 95% of the area. The inner cladding background material may also comprise two materials with similar refractive indices.

In the context of the present invention, an area of a region or an element, such as the area of the inner cladding region, unless otherwise specified refers to a cross sectional area of said region or element. Likewise, dimensions, such as a diameter or a thickness are cross sectional dimensions, unless otherwise noted.

One object of the invention is to provide a method for producing an optical fiber according to the present invention. The method comprises: providing at least one core preform element, and a plurality of inner cladding preform elements, and arranging said core preform element and said inner cladding preform elements in a preform. The preform elements are arranged such that said inner cladding preform elements surround said core preform element. Optionally, a plurality of outer cladding preform elements and/or an outer cladding preform tube are arranged to surround the core preform element and the inner cladding preform elements. Said preform is then drawn to an optical fiber. The inner cladding preform elements comprise a plurality of a first type of preform elements comprising an air hole surrounded by a high-index region.

In one embodiment of the inventive method, a ratio between the radius of the air hole and a thickness of the region of high-index material is below about 1.

One object of the invention is to provide a cladding pumped optical fiber for amplifying an optical signal, said optical fiber having a longitudinal, optical axis and a cross section perpendicular thereto. The optical fiber comprises a core region and a cladding region. The core region comprises a material doped with at least one active element; said core region being capable of guiding an optical signal in a fundamental core mode with an effective refractive index, $n_c$, at an optical signal wavelength, $\lambda_1$. The cladding region is arranged to surround the core region, the cladding region comprising an inner cladding region and an outer cladding region. The inner cladding region is capable of guiding a pump signal at a pump wavelength, $\lambda_p$. The inner cladding region comprises a background material having a refractive index, $n_b$, and a plurality of inner cladding features arranged in said background material, wherein at least a plurality of said plurality of inner cladding features are of a first type of feature. The first type of feature comprises an air hole surrounded by a high-index region comprising a high-index material having a refractive index, $n_r$, that is larger than the refractive index of the inner cladding background material. The plurality of said first type of inner cladding features are arranged to provide at least one cladding mode that suppresses higher order core modes.

One object of the invention is to provide an optical amplifier system for amplifying an optical signal at an optical signal wavelength, $\lambda_1$, said system comprising the single mode cladding pumped optical fiber according to the present invention, a pump light source, and a seed light source. The pump light source is capable of providing pump light at a pump wavelength, $\lambda_p$, said pump light source being optically coupled to said cladding pumped optical fiber. The seed light source is arranged to emit an optical signal into the core of said cladding pumped optical fiber.

One object of the invention is to provide an optical laser system for emitting an optical signal at an optical signal wavelength, $\lambda_1$, said system comprising the cladding pumped optical fiber according to the present invention; and a pump light source capable of providing pump light at a pump wavelength, $\lambda_p$, said pump light source being optically coupled to said cladding pumped optical fiber;

The single mode core of the cladding pumped optical fiber may have a large cross sectional area whereby the influence of non-linear optical effects in the core material is mitigated through a lower signal intensity per core area unit.

In one embodiment, the core region has a core effective refractive index which is substantially equal to the refractive index of the inner cladding background material. In one embodiment, an index difference between the core effective refractive index and the inner cladding background material refractive index being about $5 \cdot 10^{-4}$ or less, such as about $2 \cdot 10^{-4}$ or less, such as about $1 \cdot 10^{-4}$ or less, such as about $5 \cdot 10^{-5}$ or less.

In one embodiment, the core region has a maximum cross-sectional dimension of more than about 20 µm, such as more than about 30 µm, such as more than about 40 µm, such as more than about 50 µm, such as more than about 75 µm, such as more than about 100 µm, such as more than about 125 µm, such as more than about 150 µm, such as more than about 175 µm, such as more than about 200 µm, such as more than about 300 µm. In one embodiment, the core region has a maximum cross-sectional dimension of less than about 2000 µm, such as less than about 1500 µm, such as less than about 1000 µm, such as less than about 750 µm, such as less than about 500 µm.

In the context of the present application, the phrase "the maximum cross-sectional dimension" of a region of the optical fiber, such as the core region, refers to the diameter of a circular cross-section of the region or the diameter of a circle circumscribing a non-circular cross-section of a region.

In one embodiment, the core region has a maximum cross-sectional dimension of more than about 20 times $\lambda_1$ such as more than about 30 times $\lambda_1$, such as more than about 40 times $\lambda_1$, such as more than about 50 times $\lambda_1$, such as more than about 60 times $\lambda_1$, such as more than about 75 times $\lambda_1$, such as more than about 100 times $\lambda_1$, such as more than about 125 times $\lambda_1$, such as more than about 150 times $\lambda_1$, such as more than about 200 times $\lambda_1$, such as more than about 300 times $\lambda_1$. In one embodiment, the core region has a maximum cross-sectional dimension of less than about 2000 times $\lambda_1$, such as less than about 1500 times $\lambda_1$, such as less than about 1000 times $\lambda_1$, such as less than about 750 times $\lambda_1$, such as less than about 500 times $\lambda_1$.

In one embodiment, the area of said core region is in the range from about 300 µm² to about 67500 µm², such as in the range from about 600 µm² to about 50000 µm², in the range from about 750 µm² to about 40000 µm², in the range from about 1000 µm² to about 35000 µm², in the range from about 1200 µm² to about 32000 µm², in the range from about 1500 µm² to about 25000 µm², in the range from about 1900 µm² to about 18000 µm², in the range from about 2000 µm² to about 15000 µm²

The optical fiber may comprise a material selected from the group of silica glass, chalcogenide glass, and soft glasses.

The optical fiber may be a rod fiber, having an outer diameter of more than about 0.5 mm, such as more than about 0.75 mm, such as more than about 1 mm, such as more than about 1.5 mm, such as more than about 2 mm.

The amplification of an optical signal propagating in the core region may be due to the presence of an active material, which transfers energy from the pump light to the signal light. The active element may comprise a rare earth element selected from the group of Ytterbium (Yb), Erbium (Er), Praseodymium (Pr), Neodynium (Nd), Holmium (Ho), Thulium (Tm), Dysprosium (Dy), or combinations thereof, such as a combination of Erbium (Er) and Ytterbium (Yb).

The material doped with an active element may be arranged in different ways in the core region. In one embodiment, the active material is substantially homogenously distributed over the core region. The active part may at least partly be comprised within said core region and/or within said inner cladding region. In one embodiment, the active region comprises an annular shaped region. The annular shaped region may comprise a coherent ring surrounding the centre of said core region.

For some applications photo-darkening in an active fiber is a problem. As described in co-pending Patent Corporation Treaty application PCT/DK2009/050314 the extent to which photo-darkening occurs with time can be mitigated by reducing the overlap of the guided optical signal and the active region. The reduced modal overlap may be realized in various ways. In one embodiment, the concentration of the active element at a second radial distance, $r_2$, from the centre of said core region is higher than the concentration of the active element at a first radial distance, $r_1$, from the centre of the core region, wherein $r_1 < r_2$. In one embodiment, the concentration of said active element has a local minimum in the centre of said core region. The concentration of said active element may be substantially zero in the centre of said core region. One example of such a fiber design is seen in FIG. 3.

In one embodiment, the annular region comprises a plurality of active features arranged in a ring surrounding the centre of said core region.

A reduced modal overlap with the active region may also be realized for the optical signal guided in the core region by arranging active core features in a cross sectional confined part of said core region. The active region may comprise at least one active core feature. In one embodiment the fiber comprises at least one active core feature which is arranged substantially along a first core line. The first core line may be parallel to said first line.

The refractive index of the active features may be influenced by the presence of the active element(s). By adding one or more additional dopants, the refractive index may be adjusted. In one embodiment the active features have a refractive index profile below or substantially equal to the refractive index of said inner cladding background material.

When used as an active optical fiber wherein relatively high pump powers are applied to invert the population of the active material, thermal effects caused e.g. by a spatial non-uniform distribution of the inversion may cause the otherwise single mode optical fiber to at least partially support higher order modes. A spatial non-uniform distribution of the inversion may occur when energy most efficiently is transferred to the fundamental core mode in the center of the core, where the fundamental mode has its maximum intensity.

The active region may also be arranged so that a higher order core mode has a reduced modal overlap with the active element. In one embodiment the higher order mode(s) has a modal field overlap with the active element which is below about 50%, such as below about 25%, such as below about 20%, such as below about 15%, such as below about 10%, such as below about 5%, such as below about 1%. In one embodiment the guided optical signal may comprise light propagating in a plurality of modes, and the guided optical signal has a modal overlap with the active element which is below about 25%, such as below about 20%, such as below about 15%, such as below about 10%, such as below about 5%, such as below about 1%. In FIG. 4 is illustrated a fiber design where the fundamental core mode has its maximum intensity where the active elements are located such that the gain preferentially is stronger for said fundamental mode of said core.

An active element has at least one range of wavelengths in its emission spectrum, wherein a relatively strong emission is observed when the active element is pumped by a pump signal.

The optical fiber may be adapted for suppression of higher order modes (HOM) and/or for guiding light in a narrow spectral wavelength range. In one embodiment, a plurality of a third type of inner cladding feature forms one or more cross sectional extending optical resonant structures providing a resonant coupling of core modes to one or more light sinks.

In a core region comprising a segmentation of the active material, the ratio between the area of the active part of the core region and the area of the core region may be in the range of about 0.1 to about 0.9, such as in the range about 0.2 to about 0.8, about 0.3 to about 0.7 about 0.4 to about 0.6.

The active material may be distributed substantially over the entire core region such that the ratio between the area of the active part of the core region and the area of the core region is substantially equal to 1.

The concentration of the active element may gradually change over the core region cross section. The concentration may also be such that there is a substantially higher concentration in e.g. a circular or annular formed part of the core region and a smaller concentration in another part or the core region. In that case, the phrase "the active part" of the core region may refer to the part of the core region wherein the concentration is highest.

In one embodiment, said active part is arranged so that the fundamental core mode has a modal overlap with the active part, which is below about 50%, such as below about 25%, such as below about 20%, such as below about 15%, such as below about 10%, such as below about 5%, such as below about 1%.

The core region may further be doped with one or more materials selected from the group of Fluorine (F), Germanium (Ge), and Cerium (Ce) or combinations of these.

The fundamental mode of the core region may have an effective refractive index above the effective refractive index of the inner cladding region such that light is guided along the core region by way of total internal reflection.

The pump light may be confined to the inner cladding region by an outer cladding. The outer cladding region may have a refractive index below that of the inner cladding region. In one embodiment, the outer cladding region comprises a polymer cladding having a refractive index below that of silica. The outer cladding may comprise an air-cladding. In the context of the present application the phrase "air-cladding" refers to the situation wherein a number of air holes are arranged in a chain surrounding the inner cladding region. The width of the silica regions arranged between two neighboring air holes in the chain may be less than about 1.2 µm, such as less than about 1 µm, such as less than about 0.9 µm, such as less than about 0.8 µm, such as less than about 0.7 µm, such as less than about 0.6 µm, such as less than about 0.5 µm, such as less than about 0.4 µm, The signal wavelength may be in the emission band of said active material, such as in the Ytterbium emission band which is in the range of about 900 nm to about 1200 nm, such as in the Erbium emission band, which is in the range of about 1500 nm to about 1600 nm, such as in the Thulium emission band, which is in the range of about 1800 nm to about 2400 nm.

The pump wavelength may be in the absorption band of said active material.

The inner cladding features may in principle be arranged in any way whereby the requirements to the effective refractive index of the inner cladding region are fulfilled and wherein the first type of inner cladding features may be arranged to couple optically, i.e. these features are arranged at a feature-to-feature spacing which allows for a transfer of optical power from a mode supported by one first type of inner cladding feature to another at said first wavelength forming so-called super-modes which are combinations of local modes of the first type of features.

In one embodiment, the inner cladding features are arranged in a substantially periodic lattice with a periodicity, $\Lambda$, such as a hexagonal lattice.

The periodicity, $\Lambda$, of said lattice may be such that the ratio $\Lambda/\lambda_1$ is more than about 5, such as more than about 8, such as more than about 10, such as more than about 12, such as more than about 15, such as more than about 20, such as more than about 30, such as more than about 40, such as more than about 50. The ratio $\Lambda/\lambda_1$ may be in the range of about 5 to about 60, such as in the range of about 8 to about 40, such as in the range of about 10 to about 30, such as in the range of about 12 to about 28, such as in the range of about 15 to about 25, such as in the range of about 18 to about 22.

In one embodiment, the periodicity, $\Lambda$, of said lattice is more than about 5 µm, such as more than about 8 µm, such as more than about 10 µm, such as more than about 12 µm, such as more than about 15 µm, such as more than about 17 µm, such as more than about 20 µm, such as more than about 23 µm, such as more than about 26 µm, such as more than about 30 µm, such as more than about 40 µm, such as more than about 50 µm, such as more than about 75 µm, such as more than about 100 µm. The periodicity may be below about 500 µm, such as below about 400 µm, such as below about 200 µm, such as below about 150 µm, such as below about 125 µm.

In one embodiment, a major part of said first type of inner cladding features, such as all of the first type of inner cladding features, are arranged with a substantially constant feature-to-feature spacing. The said spacing may be more than about 5 µm, such that more than about 8 µm, such that more than about 10 µm, such that more than about 12 µm, such that more than about 15 µm, such that more than about 20 µm, such that more than about 25 µm, such that more than about 30 µm, such that more than about 50 µm. The spacing may be smaller than about 250 µm.

The ratio between said spacing and said first wavelength may be more than about 5, such that more than about 8, such that more than about 10, such that more than about 12, such that more than about 15, such that more than about 20, such that more than about 25, such that more than about 30. The ratio may be smaller than about 250.

The high-index region of the first type of inner cladding feature provides a change in the refractive index profile which may result in a super-mode with an effective refractive index which is more sensitive to the hole diameter than when the high-index region is not present. The high-index region may take different cross sectional shapes, such as a ring, such as a ring defined by an inner circle and an outer circle, a chain comprising high-index elements, a chain comprising at least a first element comprising high-index material and a second element, two semi-circles and in principle any arrangement of the material to at least partially surround the air hole of the first type of feature.

In one embodiment an average thickness, $t_{avg}$, of the high-index region and the periodicity of the lattice is such that $t_{avg}/\Lambda$ is more than about 0.01, such as more than about 0.05, such as more than about 0.08, such as more than about 0.10, such as more than about 0.15, such as more than about 0.18, such as more than about 0.20, such as more than about 0.25, such as more than about 0.3, such as more than about 0.35, such as more than about 0.4 such as more than about 0.45.

In a high-index region with a uniform width, the average thickness of the region is equal to the thickness of the region, such that the thickness of the ring defined by concentrically arranged inner and outer circles is equal to the average thickness of that ring.

A diameter, $d_1$, of the air hole of said first type of feature may be such that the $d_1/\Lambda$ ratio is below about 0.5, such as below about 0.4, such as below about 0.35, such as below about 0.3, such as below about 0.25, such as below about 0.2, such as below about 0.15, such as below about 0.1, such as below about 0.05.

The optical fiber according to the present invention may comprise several different types of inner cladding features. Some of these may be arranged to provide a certain distance between the first type of features in order to control the coupling between the modes supported by these features. Other types of inner cladding features may be arranged to provide a further functionality to the optical fiber, such as a resonant coupling of core modes to a reservoir.

In one embodiment, the plurality of inner cladding features further comprises a second type of feature comprising a low-index region. In one embodiment, the low-index region is or comprises an air hole. In one embodiment, the low-index region is or comprises a down-doped region.

In one embodiment the diameter of the air holes in the first and second type of features is substantially identical, such as the difference in the diameters being less than about 25% of the diameter of said first type of feature, such as less than about 20%, such as less than about 15%, such as less than about 12%, such as less than about 10%, such as less than about 8%, such as less than about 5%, such as less than about 2%, such as the air holes being practically identical.

In the preform from which the optical fiber is produced, the diameter of the air hole of a first type of preform element may be smaller than the diameter of the air hole of a second type of preform element. When the preform is heated during the drawing procedure used to fabricate the optical fiber from the preform, the difference in the air hole diameters may level out to some extent.

In one embodiment, the air holes of the first type of features are slightly larger than the air holes of the second type of feature, such as at least about 5% larger, such as at least about 8% larger, such as at least about 10% larger, such as at least about 15% larger, such as at least about 20% larger, such as at least about 25% larger, such as at least about 50% larger.

In another embodiment, the air holes of the second type of features are slightly larger than the air holes of the first type of feature, such as at least about 5% larger, such as at least about 8% larger such as at least about 10% larger such as at least about 15% larger such as at least about 20% larger such as at least about 25% larger such as at least about 50% larger The first and second type of features may be arranged such that for a major part of said first type of features, the nearest neighbor cladding features are of said second type. In an inner cladding region, wherein said inner cladding features are arranged in a substantially hexagonal lattice, the six nearest neighbors surrounding a first type of feature may be of said second type. An example of an optical fiber design comprising such an inner cladding region is seen in FIG. 2, The second type of feature may differ from said first type of feature at least in respect to a composition of material surrounding said air hole. The second type of feature may comprise a high-index region surrounding its air hole. In one embodiment, such a high-index region in said second type of feature has a refractive index below the refractive index of the high-index region of said first type of feature. The difference in the refractive indices of the high-index region of the first type of feature and that of a high-index region in the second type of feature is at least about $1\cdot10^{-5}$, such as at least about $5\cdot10^{-5}$, such as at least about $1\cdot10^{-4}$, such as at least about $5\cdot10^{-4}$, such as at least about $7\cdot10^{-4}$, such as at least about $1\cdot10^{-3}$, such as at least about $2\cdot10^{-3}$. The index difference may be below about $1\cdot10^{-2}$.

A high-index region of said second type of feature may extend over a cross sectional area which is smaller than the area of said high-index region of said first type of feature, such as an area which is at least about 2 times smaller, such as about 3 times smaller, such as about 4 times smaller, such as about 5 times smaller, such as about 7 times smaller, such as about 9 times smaller, such as about 10 times smaller, such as about 16 times smaller, such as about 20 times smaller, such as about 25 times smaller, such as about 30 times smaller, such as about 36 times smaller, such as about 40 times smaller, such as about 49 times smaller, such as about 64 times smaller, such as about 81 times smaller, such as about 100 times smaller, such as about 150 times smaller, such as about 200 times smaller, such as about 400 times smaller, such as about 600 times smaller, such as about 1000 times smaller, such as the second type of feature being substantially free of material having a high index.

In one embodiment, the second type of feature consists of said air hole and inner cladding background material.

The plurality of inner cladding features may comprise several different types of features, such as a third and fourth type of feature. In one embodiment, the different types of features are arranged so that the inner cladding region is capable of suppressing higher order core modes in at least a wavelength interval.

The high-index region of said first type of feature may comprise germanium doped silica.

In one embodiment, the first type of inner cladding feature further comprises a second region. The second region may comprise a material with a refractive index below that of the high-index region. The second region may comprise a material with a refractive index above that of the inner cladding background material.

Such a second region in said first type of inner cladding features may be arranged in different ways relative to the high-index region. In one embodiment, the second region is arranged to surround said high-index region. An example of such a configuration is illustrated in FIG. 7d. In one embodiment, the high-index region is arranged to surround said second region. An example of such a configuration is illustrated in FIG. 7e.

The index difference between the high-index material and the background material of the inner cladding is at least about $1\cdot10^{-5}$, such as at least about $5\cdot10^{-5}$, such as at least about $1\cdot10^{-4}$, such as at least about $5\cdot10^{-4}$, such as at least about $7\cdot10^{-4}$, such as at least about $1\cdot10^{-3}$, such as at least about $1.5\cdot10^{-3}$, such as at least about $2\cdot10^{-3}$, such as at least about $2.5\cdot10^{-3}$, such as at least about $3\cdot10^{-3}$, such as at least about $4\cdot10^{-3}$. The index difference may be below about $1\cdot10^{-2}$.

The high-index region of said first type of feature may have a cross sectional area of more than about 5 $\mu m^2$, such as more than about 10 $\mu m^2$, such as more than about 20 $\mu m^2$, such as more than about 30 $\mu m^2$, such as more than about 40 $\mu m^2$, such as more than about 50 µm², such as more than about 60 µm², such as more than about 70 µm², such as more than about 75 µm², such as more than about 80 µm², such as more than about 100 µm², such as more than about 125 µm², such as more than about 150 µm², such as more than about 200 µm², such as more than about 300 µm², such as more than about 400 µm², such as more than about 500 µm². The cross sectional area may be smaller than about 1000 µm²

In one embodiment, the inner cladding region comprises a reservoir material having a refractive index, which is above the effective refractive index of the optical mode supported by the first type of inner cladding feature. This reservoir material may be arranged in a region surrounding the part of the inner cladding, wherein said inner cladding features are arranged.

The first and second type of features may be arranged such that for a major part of said first type of features, the nearest neighbor cladding features are inner cladding features of the second type. In an inner cladding region wherein said inner cladding features are arranged in a substantially hexagonal lattice, the six nearest neighbors surrounding a first type of feature may be of a different type of feature, such as said second type or a combination of features that are different from said first type of feature.

The first type of inner cladding features may be arranged such that the modes supported by these features are able to couple with modes of the neighboring first types of features. Preferably at least one type of inner cladding features, such as the first type of feature is capable of supporting an optical mode at the signal wavelength. In one embodiment, the high-index region of the first type of feature is arranged to ensure that a mode is supported at the signal wavelength. The high-index material in said first type of feature may be arranged in the high-index region in different ways allowing a mode to be supported. In one embodiment, the high-index region of at least a part of said first type of features has a substantially angular uniform refractive index profile.

The uniform refractive index profile may be realized by using a uniform germanium doping. In one embodiment, the high-index region has a refractive index profile with an angular variation. The angular variation may be such that the refractive index profile of the region has a substantially n-fold rotational symmetry where n may be 2, 3, 4, 5, 6, 8, 10, or more than 10.

In one embodiment, the first type of inner cladding feature is capable of supporting an optical mode, which at the optical signal wavelength, $\lambda_1$, has an effective refractive index that is smaller than the effective refractive index of the fundamental core mode, and in a range of wavelengths shorter than the optical signal wavelength, $\lambda_1$, has an effective refractive index that is larger than or equal to the effective refractive index of the fundamental core mode.

In one embodiment, the first type of inner cladding feature is capable of supporting at least one mode which at the optical signal wavelength, $\lambda_1$, has an effective refractive index that is equal to or larger than the effective refractive index of the first higher order mode of said core region and that is smaller than the effective refractive index of the fundamental core mode at the optical signal wavelength, $\lambda_1$.

The inner cladding features may be arranged in a substantially hexagonal lattice and said core region corresponds to replacing 7 or 19 inner cladding features with solid rods. In one embodiment, the solid rods comprise a silica material, such as a silica material doped with Germanium and/or Fluorine.

In one embodiment of the method according to the invention, the core preform element comprises a material doped with at least one active element. If more than one core preform element is used, one or more of the elements may comprise a material doped with at least one active element.

In one embodiment, the first type of preform elements arranged in a preform further comprises a region of inner cladding background material arranged to surround said high-index region.

The inner cladding preform elements may further comprise a plurality of a second type of preform elements, each of said elements comprising an air hole. In one embodiment, the air hole of said second type of preform element is surrounded by a region of inner cladding background material.

The method according to the present invention may further comprise stacking said inner cladding preform elements in a lattice, such as a hexagonal lattice. In one embodiment, the preform comprises 7 or 19 core preform elements arranged in said hexagonal lattice to provide the core region in said optical fiber.

The first and second types of inner cladding features may be arranged such that for a major part of said first type of preform elements, the nearest neighbor inner cladding preform elements are of the second type of preform element.

The method may further comprise providing said first type of preform elements by fusing together a structure comprising an inner tube surrounded by a number of rods with a high-index material and an outer tube comprising background material, wherein the air hole of the inner tube is maintained during fusing. When said inner tube comprises high index material the first type of preform may have the cross sectional design illustrated in FIG. 7b.

In one embodiment, the drawing of said preform to an optical fiber comprises drawing said preform to a cane that subsequently is drawn to said optical fiber. Prior to being drawn to an optical fiber, said cane may be provided with an over-cladding.

In one embodiment, at least a part of said outer cladding preform elements comprise an air hole and are arranged in a chain surrounding said inner cladding preform elements, such that an air cladding is provided in said optical fiber.

In one embodiment, the high index region is capable of increasing its inner diameter during the drawing in response to an increase in the air hole. In this context, an increase of an air hole is to be understood as an increase in absolute size and/or size relative to an outer diameter of the fiber, when compared to a fiber in which the air hole has not been increased.

The refractive index is generally the conventional refractive index of a homogeneous material. The effective refractive index is the index that light at a given wavelength, $\lambda$, experiences when propagating through a given material that may be inhomogeneous (meaning that the material complex e.g. comprises two or more sub-materials, which may be a background material of one refractive index and one or more types of features (often termed micro-structural elements in the present application) of different refractive index/indices). For homogeneous materials, the refractive and the effective refractive index will naturally be similar.

For the optical fiber according to the present invention, the most important optical wavelengths are in the ultra-violet to infrared regime (e.g. wavelengths from approximately 150 nm to 11 µm). In this wavelength range the refractive index of most relevant materials for fiber production (e.g. silica) may be considered mainly wavelength independent, or at least not strongly wavelength dependent. However, for non-homogeneous materials, such as fibers comprising micro-structural elements, e.g. voids or air holes, the effective refractive index may be highly dependent on the morphology of the material.

Furthermore, the effective refractive index of such a fiber may be strongly wavelength dependent. The procedure of determining the effective refractive index at a given wavelength of a given fiber structure having voids or holes is well-known to those skilled in the art (see e.g. Broeng et al, Optical Fibre Technology, Vol. 5, pp. 305-330, 1999).

In one embodiment, the index difference between the high-index ring and the background material of the inner cladding is provided by down-doping said inner cladding background material. The high-index ring may then comprise up-doped silica material or substantially pure silica.

The inner cladding features may be placed in an ordered arrangement (such as in a lattice) or in an arrangement having little order or periodicity. In one embodiment, the arrangement of the inner cladding features substantially surrounds said core region. In one embodiment, the arrangement of the inner cladding features comprises localized sections that only partially surround said core region. The inner cladding features may be arranged in one or more separate sections that each are confined within corresponding angular ranges in said cross section.

In one embodiment, the ratio between the radius of the air hole and the thickness of the region of high-index material is below about 0.9, such as below about 0.8, such as below about 0.7, such as below about 0.6 such as below about 0.5, such as below about 0.4, such as below about 0.3, such as below about 0.2.

The inner cladding features may further comprise a third type of feature arranged in one resonant structure providing a resonant coupling of light in a first wavelength range from said core region to said outer cladding region. The inner cladding features may further comprise a fourth type of feature arranged in a second resonant structure providing a resonant coupling of light in a second wavelength range from said core region to said outer cladding region. The first and second wavelength ranges may be sensitive to a bending of the optical fiber.

The high-index ring of said first type of feature allows these features to support one or more optical modes.

In one embodiment, the effective refractive index of the mode supported by said first type of feature may be tuned by changing the diameter of the air hole of said first type of feature influences.

In one embodiment, the second type of feature consists of an air hole surrounded by a region of inner cladding background material.

In one embodiment, both the first and the second type of features comprise a high-index ring. The features may then be distinguished at least by the thickness of the high-index ring of the features. The ratio between the thickness in the second type of feature and the thickness in the first type of feature may be below about 0.9, such as below about 0.8, such as below about 0.7, such as below about 0.6, such as below about 0.5, such as below about 0.4, such as below about 0.3, such as below about 0.2, such as below about 0.1, such as below about 0.05, such as below about 0.02.

The arrangement of inner cladding features may make the optical fiber according to the present invention birefringent. This birefringence may be enhanced or lowered, or a birefringence may be introduced, by adding stress applying elements to the fiber. In one embodiment, the optical fiber further comprises stress applying elements arranged to apply stress to said core region and/or said inner cladding features. These said stress applying elements may comprise Boron (B) and/or Fluorine (F) doped silica. The stress applying elements may also be referred to as stress applying inner cladding features.

When the core is passive, i.e. only comprises insufficient amount of active material, such as no active material, the optical fiber may still provide amplification of an optical signal. In one embodiment the wavelength of the pump signal is shifted downwards in wavelength relative to the wavelength of the optical signal, the wavelength shift corresponding to the Raman shift of silica glass, and the optical system according to the present invention is capable of providing Raman gain to an optical signal propagating in the core region. In one embodiment, the signal wavelength is 1064 nm and the pump wavelength is in the order of 1010 nm.

In one embodiment, the plurality of first type of inner cladding features provides a suppression of the fundamental core mode in a stop band arranged at shorter wavelengths than the wavelength interval, wherein the core region is single-mode. The optical fiber may thus filter out short-wavelength Amplified Spontaneous Emission from the core region, while being single mode at the signal wavelength. In one embodiment, the core region is single mode at a signal-wavelength of 1064 nm and core modes are suppressed at wavelengths in an interval around a wavelength of 1030 nm.

In one embodiment, the pump light source comprises a laser capable of emitting light at a wavelength of the absorption spectrum of said active element.

In one embodiment, the seed light source comprises a seed light laser source.

The pump light may be coupled into the cladding region of said optical fiber using an optical elements selected from the group of fiber taper, a pump reflective mirror, a lens system, or a splicing to a pump delivery fiber.

The pump light source may comprise a laser capable of emitting light at a wavelength of the absorption spectrum of said active element.

The laser system may further comprise elements for Q-switching.

Said system may further comprising at least one pump power reflector.

MODE(S) FOR CARRYING OUT THE INVENTION

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

Figure 1:
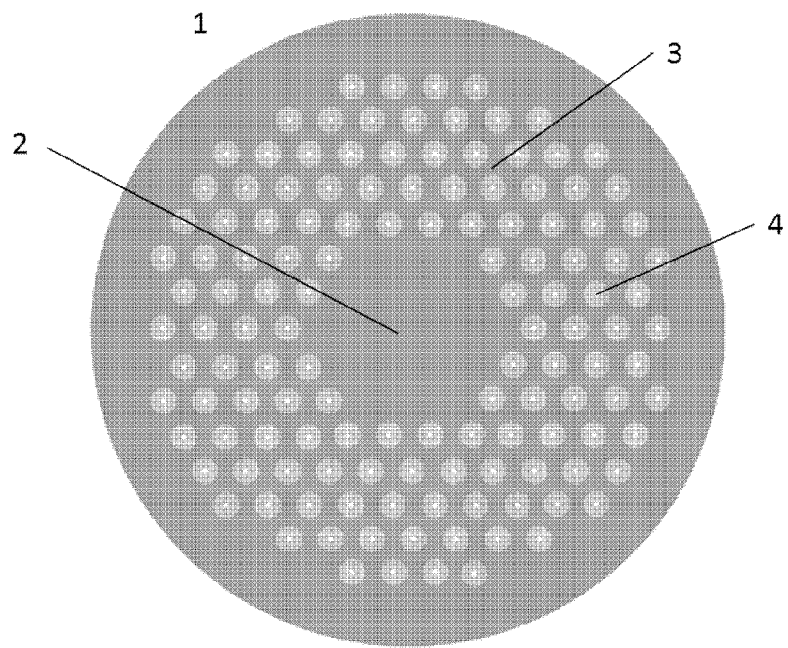
FIG. 1 shows a schematic design of an optical fiber according to the present invention.
Figure 13:
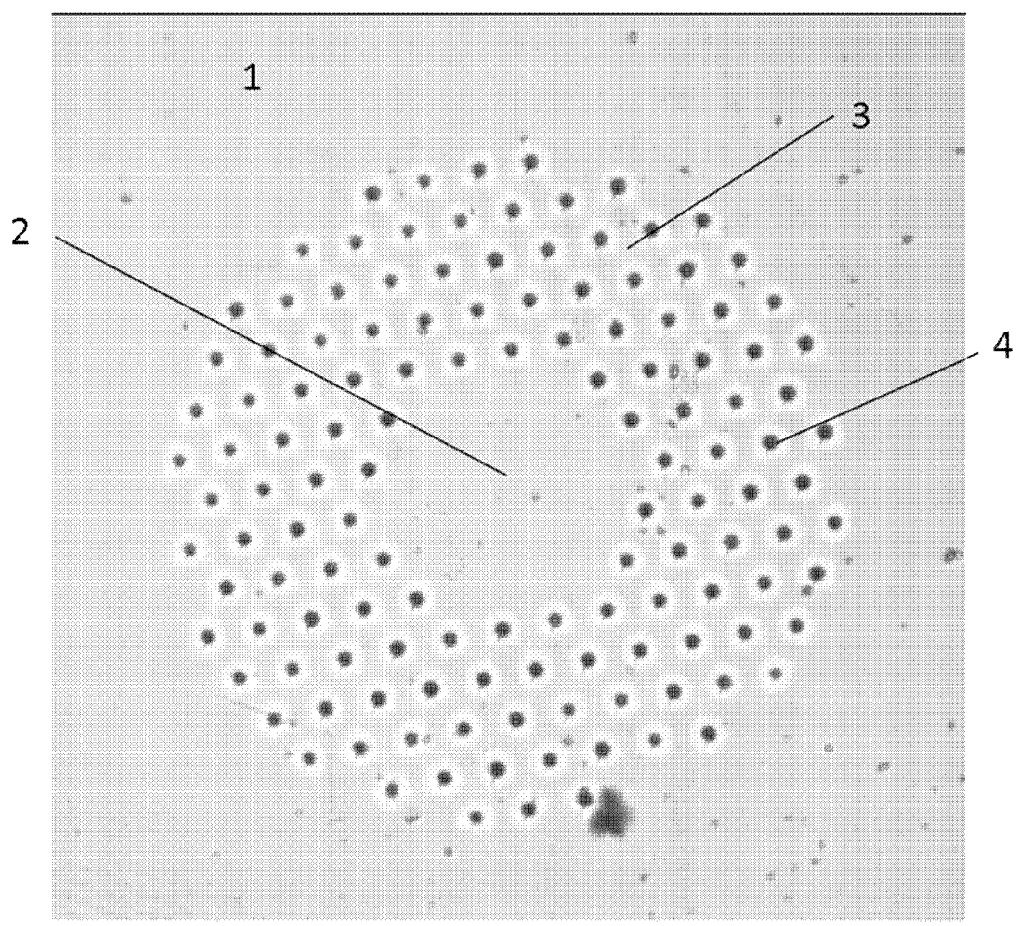
FIG. 13 shows an image of the end facet of an optical fiber with a first type of inner cladding features arranged in a hexagonal lattice.

FIG. 1 shows a design of the optical fiber 1, wherein all inner cladding features arranged in the inner cladding region 3 are of the first type of feature 4. The inner cladding features are arranged in a hexagonal lattice and the core region 2 corresponds to 19 cells in the lattice. FIG. 13 shows an image of a realized optical fiber 1 with such a design. The first type of features 4 comprises an air hole (dark part) surrounded by the high-index region (bright part) which is formed substantially as a cylindrical structure having a ring formed cross sectional area. The pitch of the hexagonal lattice is 14.5 µm, the diameter of the air holes is 3.5 µm, and the thickness of the high-index region is approximately 3 µm.

Figure 15:
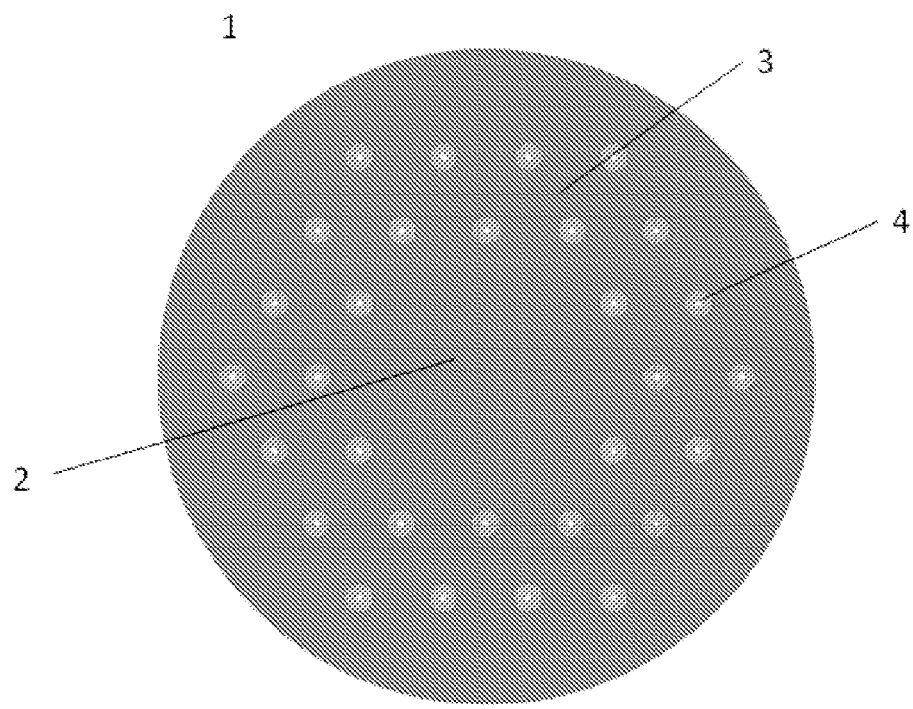
FIG. 15 shows a schematic design of an optical fiber according to the present invention.

FIG. 15 shows a design of an optical fiber 1, which corresponds to the fiber shown in FIG. 1. Therefore, only the differences between the two embodiments are discussed here. The core region 2 in this embodiment corresponds to 7 cells in the hexagonal lattice. Compared to the embodiment of FIG. 1, this embodiment has smaller inner cladding features 4, relative to the periodicity of the lattice. The fiber 1 is here illustrated with only two rings of inner cladding features, but the skilled person will realise that the fiber may have another number of rings, such as 3, 4, 5 or more without deviating from the invention.

Figure 2:
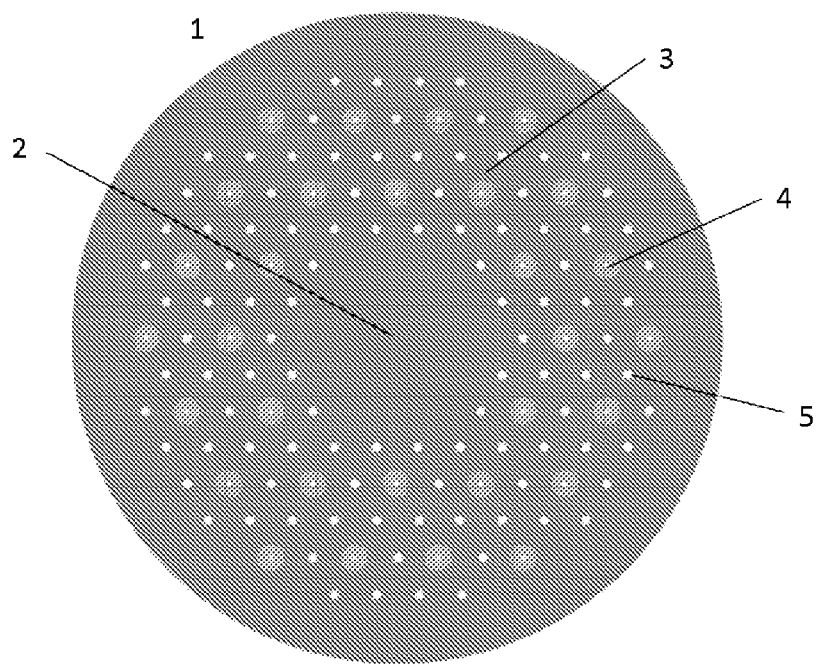
FIG. 2 shows a schematic design of an optical fiber according to the present invention.
Figure 14:
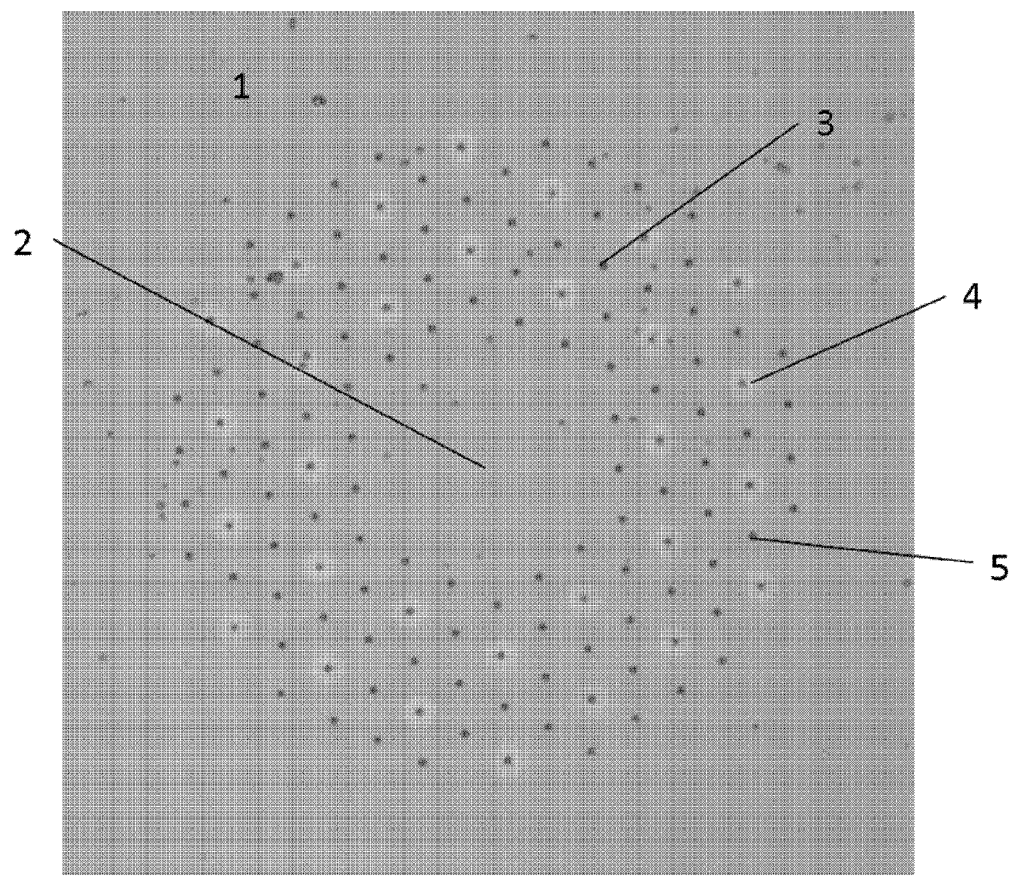
FIG. 14 shows an image of the end facet of an optical fiber with inner cladding features arranged in a hexagonal lattice where a part of these are of the first type of feature.

FIG. 2 shows a design of the optical fiber 1, wherein a part of said inner cladding features arranged in the inner cladding region 3 are of the first type of feature 4 and a part are of the second type of feature 5. The inner cladding features are arranged in a hexagonal lattice and the nearest neighbour of all the first type of features 4 are inner cladding features of the second type 5 comprising an air hole. The core region 2 corresponds to 19 cells in the hexagonal lattice. The arrangement of the first type of features defines a honeycomb-like or kagome lattice. FIG. 14 shows an image of a realized optical fiber 1 with such a design. The first type of features 4 comprises an air hole (dark part) surrounded by the high-index region (bright part) which is formed substantially as a cylindrical structure having a ring formed cross sectional area. The second type of feature 5 is made of an air hole surrounded by the inner cladding material. The pitch of the hexagonal lattice is 14.5 µm and the thickness of the high-index region is approximately 4 µm, the air hole diameter of the first and second type of feature is approximately 2 µm.

Figure 16:
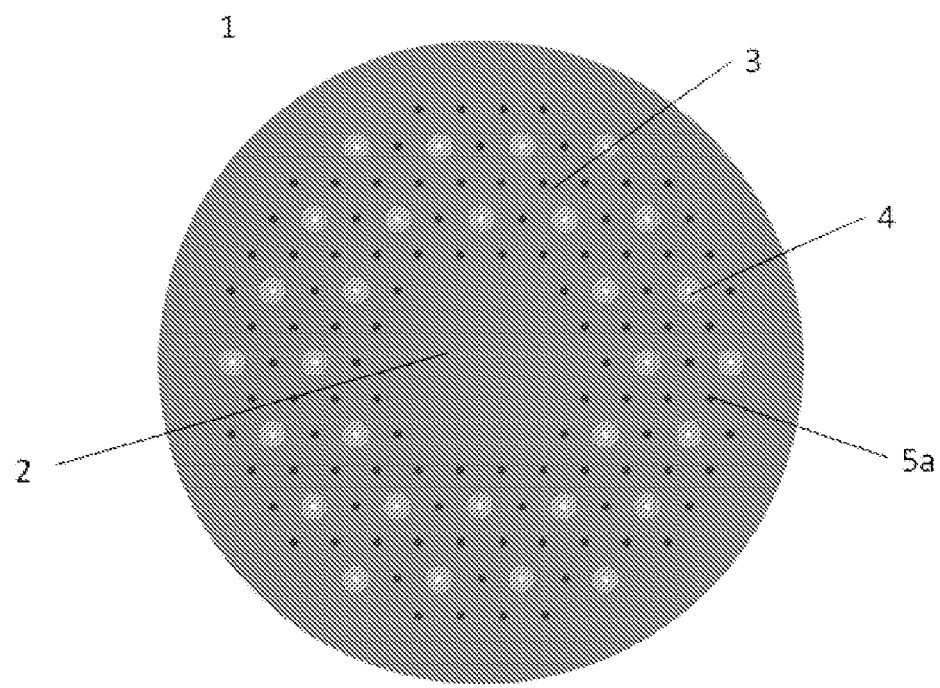
FIG. 16 shows a schematic design of an optical fiber according to the present invention.

FIG. 16 shows a design of an optical fiber 1, which corresponds to the design shown in FIG. 2. Therefore, only the differences between the two embodiments are discussed here, where like reference numerals refer to like or corresponding features. In this embodiment, the inner cladding features of the second type 5a are down doped regions, e.g. comprising Fluorine-doped silica. The skilled person will realise that a combination of the embodiments of FIG. 2 and FIG. 16 may be envisioned, comprising one or more inner cladding features of the second type comprising an air hole and one or more inner cladding features of the second type comprising a down-doped region. In this way, a large degree of tailorability of the effective refractive index profile of the inner cladding region may be achieved.

Figure 17:
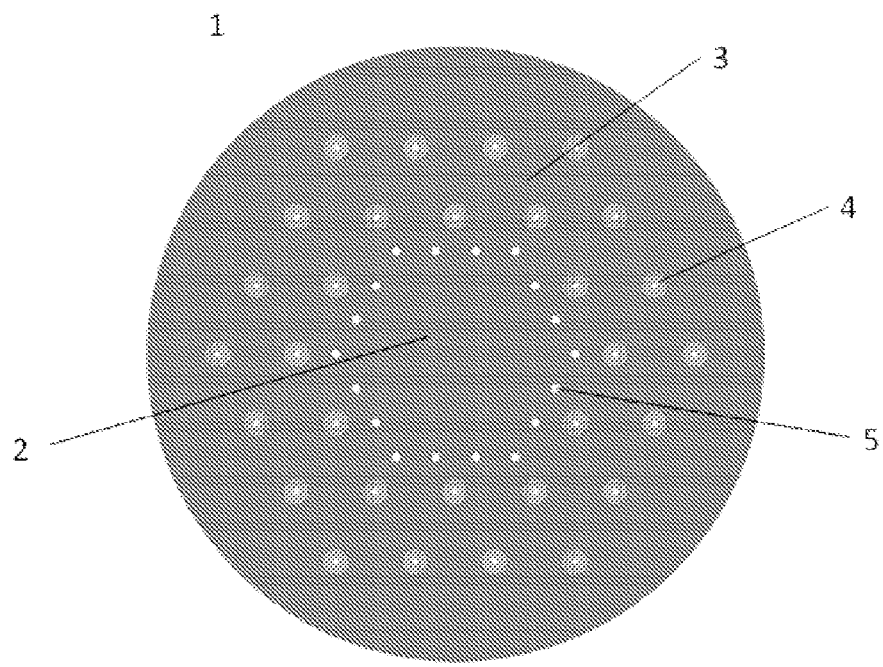
FIG. 17 shows a schematic design of an optical fiber according to the present invention.

FIG. 17 shows a design of an optical fiber 1, which corresponds to the design shown in FIG. 2 and FIG. 16. Therefore, only the differences between the two embodiments are discussed here. In this embodiment, inner cladding features of the second type 5 are only included immediately surrounding the core region 2, while second type features 5 have been left out elsewhere in the fiber structure.

Figure 18:
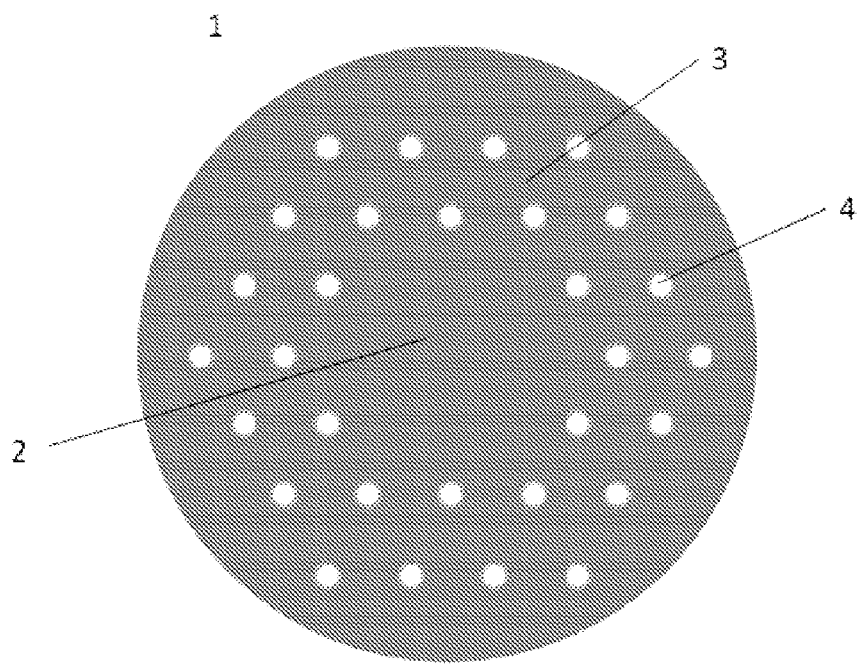
FIG. 18 shows a schematic design of an optical fiber according to the present invention.
Figure 19:
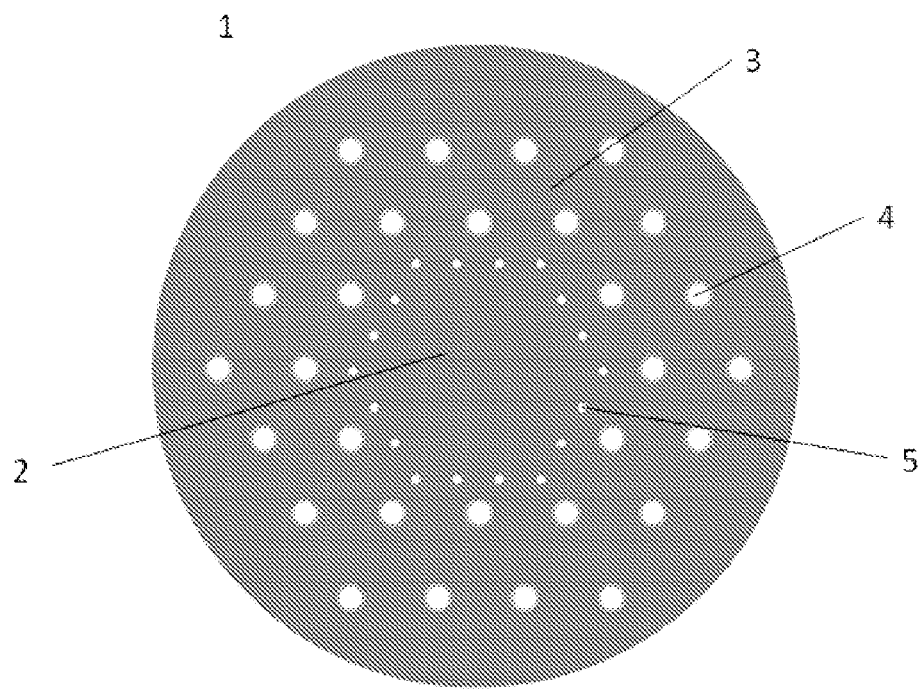
FIG. 19 shows a schematic design of an optical fiber according to the present invention.

FIGS. 18 and 19 shows embodiments of optical fibers 1, corresponding to the embodiments of FIGS. 15 and 17, respectively. In the present embodiments, the air holes of the inner cladding features of the first type 4 have increased diameters, relative to the lattice periodicity, when compared to the fibers of FIGS. 15 and 17.

Figure 3:
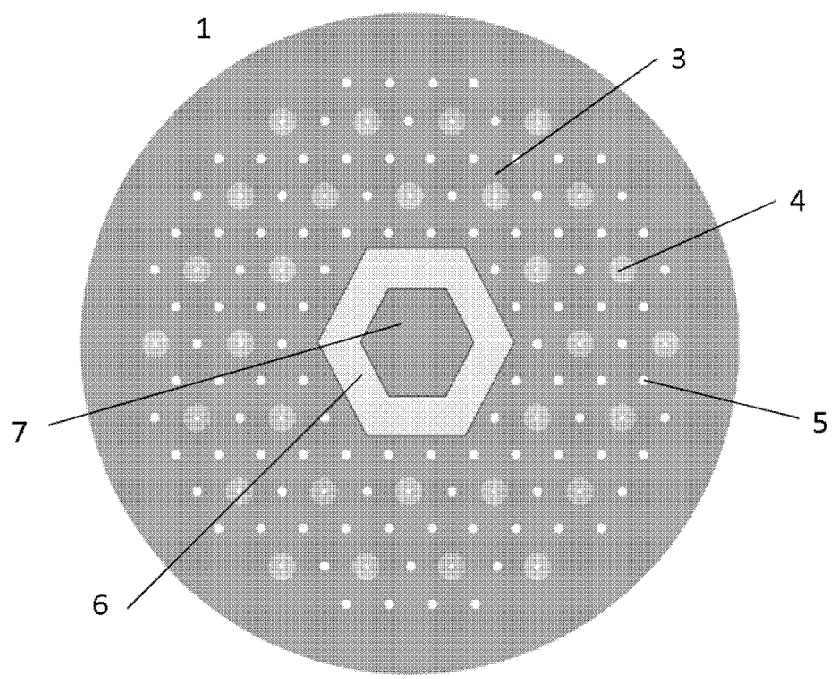
FIG. 3 shows a schematic design of an active optical fiber according to the present invention for providing a reduced modal overlap of the fundamental core mode to the active part of said core region.
Figure 4:
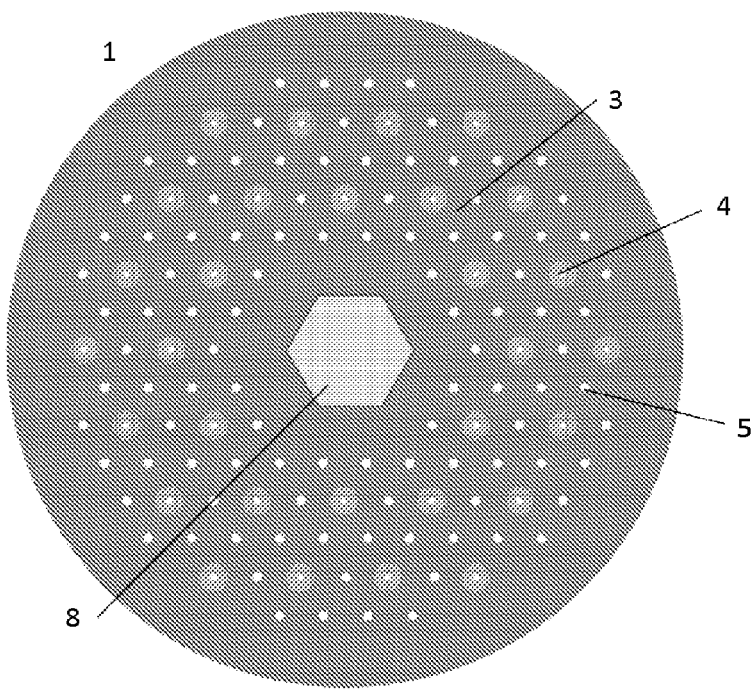
FIG. 4 shows a schematic design of an active optical fiber according to the present invention wherein the gain preferentially is stronger for said fundamental mode of said core.
Figure 20:
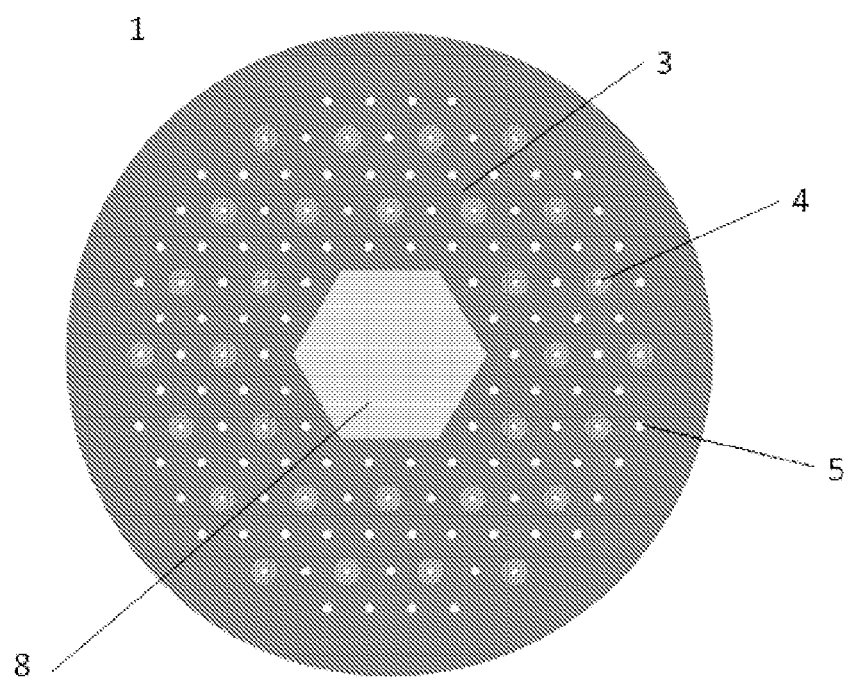
FIG. 20 shows a schematic design of an active optical fiber according to the present invention.

FIGS. 3, 4 and 20 show examples of active fibers designs according to the present invention, wherein the concentration of active material in the core is segmented. In FIG. 3, the active part of the core 6 is formed as a coherent ring surrounding a centre 7 of said core region. In FIG. 4, the active part 8 is arranged in the center of the core wherein the fundamental core mode has its maximum intensity and at the perimeter of the core region where pump induced higher order modes may occur, the concentration of the active material is smaller. In FIG. 20, the active part 8 comprises substantially the whole core region.

Figure 5:
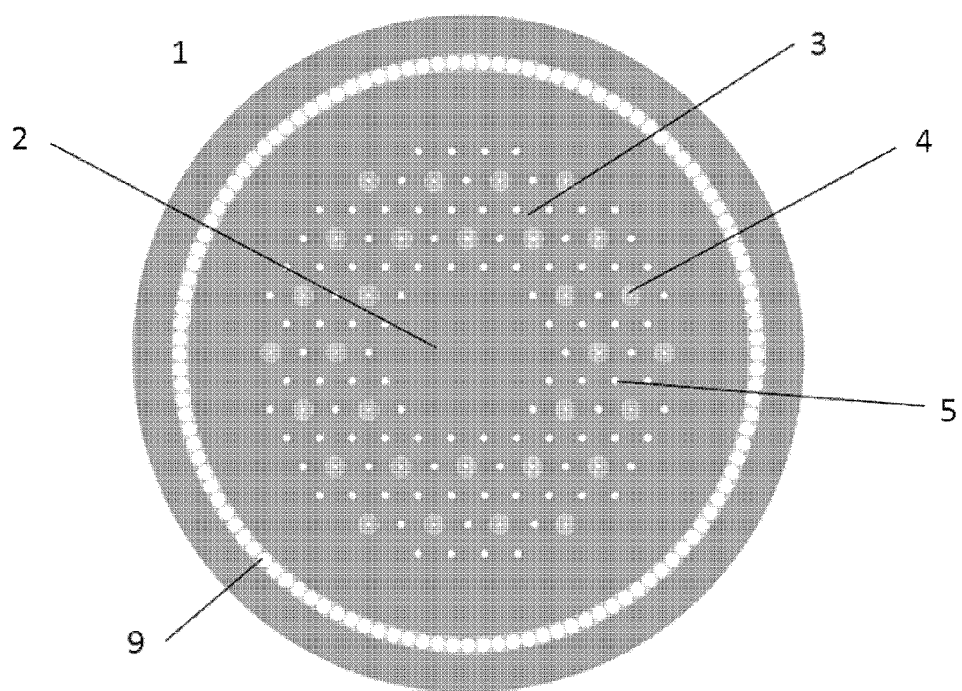
FIG. 5 shows a schematic design of an optical fiber according to the present invention wherein the outer cladding region comprises an air-cladding.
Figure 6:
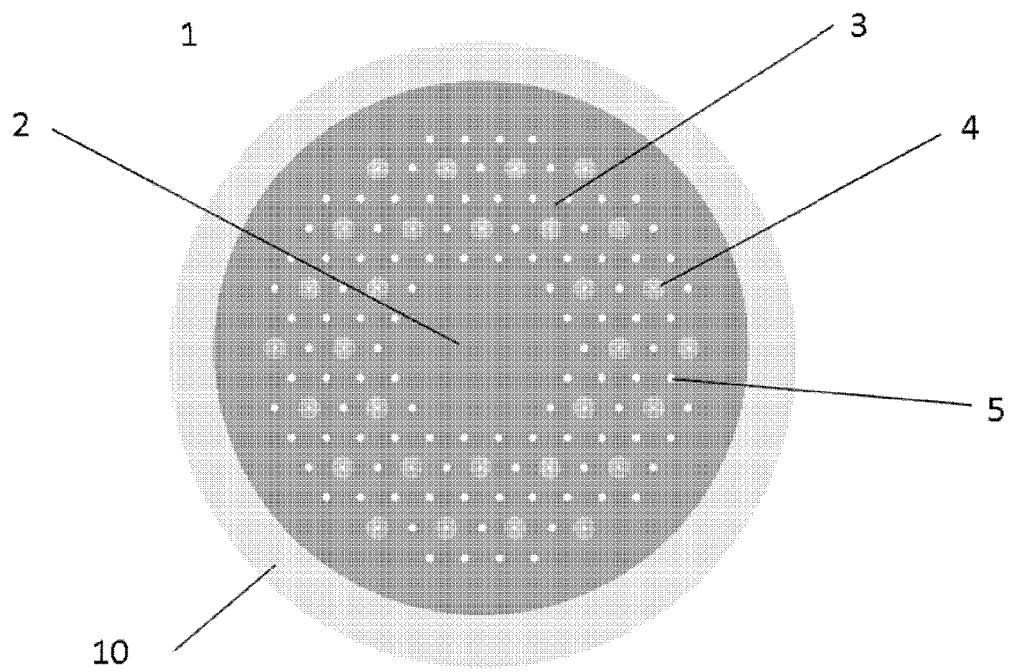
FIG. 6 shows a schematic design of an optical fiber according to the present invention wherein the outer cladding region comprises a polymer cladding.

FIGS. 5 and 6 show designs where the outer cladding region comprises an air cladding 9 and a polymer cladding 10 surrounding the inner cladding region 3 comprising first type of inner cladding features 4 arranged in a honeycomb-like or kagome lattice where each first type of feature is surrounded by second type of features 5.

Figure 7:
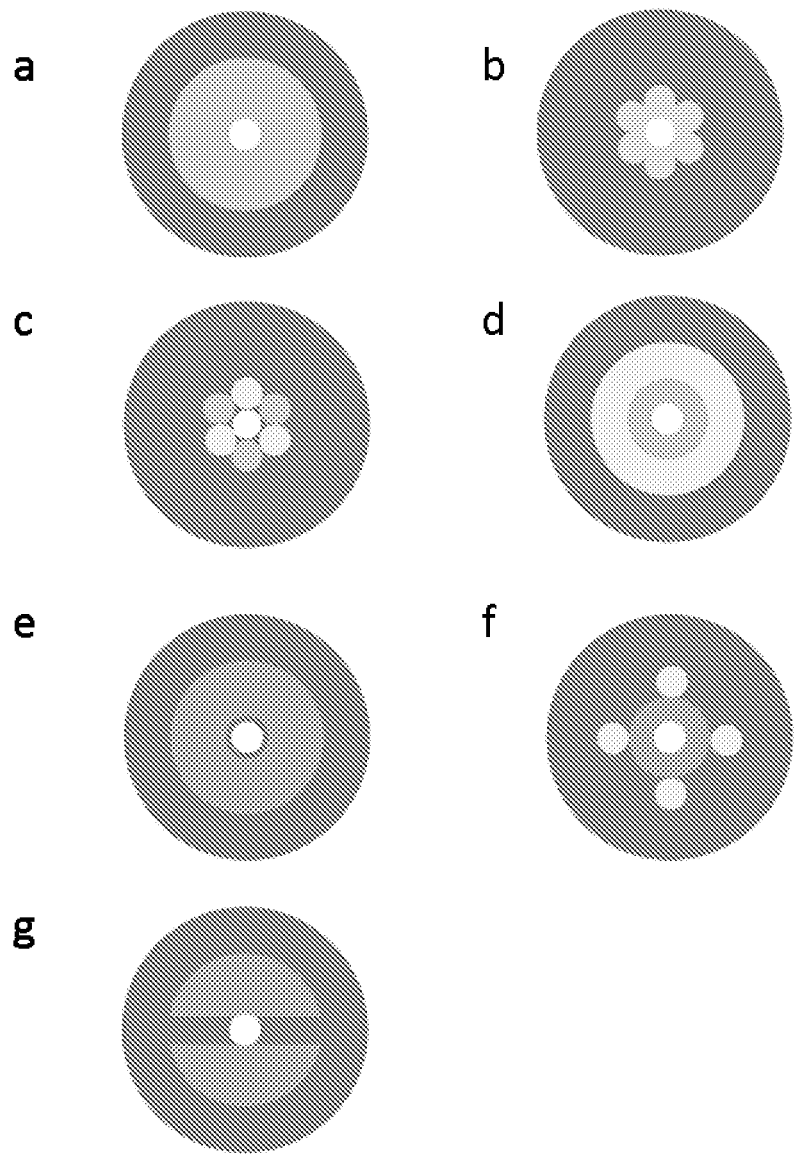
FIG. 7 shows different designs of the first type of preform element.

FIG. 7 show different arrangements of the high-index material in relation to the air hole of the first type of feature. The white region in the center of the first type of feature is the air hole, the darkest part is the inner cladding background material. In FIG. 7a, the high-index material is arranged in a ring, In FIG. 7b, the arrangement of high-index material is provided by placing high-index rods between a high-index inner tube and an outer tube of inner cladding background material, and fusing this structure while maintaining the air hole open. In FIG. 7c rods of alternating refractive indices are arranged in a chain surrounding the air hole. In Fig. 7d, two concentrically arranged rings of different refractive indices surrounds the air hole. The refractive index of at least one of these rings is above that of the inner cladding background material. Optionally both rings have a refractive index above that of the inner cladding background material. In FIG. 7e a ring of inner cladding background material is arranged inside the high-index region. In FIG. 7f a high-index region comprising a combination of high-index rods and a high-index ring is shown. FIG. 7g shows a high-index region being comprised as a number of sub-regions.

Figure 8:
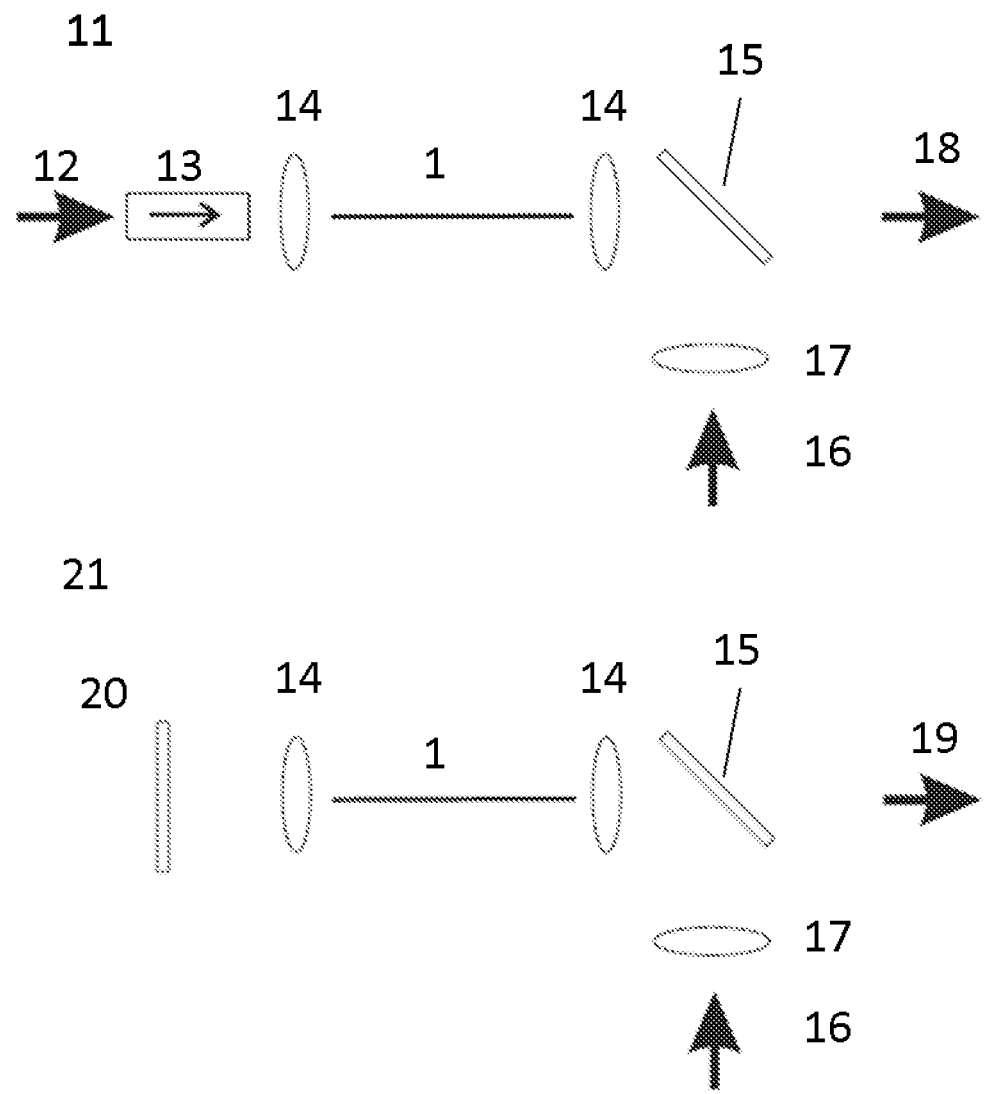
FIG. 8 shows schematics of an amplifier setup and a laser setup comprising the optical fiber according to the present invention.

The application of an active optical fiber 1 according to the present invention in an amplifier configuration 11 and a laser configuration 21 is illustrated in FIG. 8.

In the amplifier configuration, an optical signal is emitted from a light source 12 and passes though an isolator 13 before being coupled into the optical fiber 1. A pump signal 16 is coupled into the inner cladding using lenses 17, 14 and a pump reflector 15. Inside the optical fiber, the optical signal is amplified and exits the system at the end opposite to the light source as indicated by arrow 18.

In the laser system 21, a reflector element 20 forms part of the laser cavity while the end facet arranged opposite to the reflector element may constitute the other reflector of the cavity.

Figure 9:
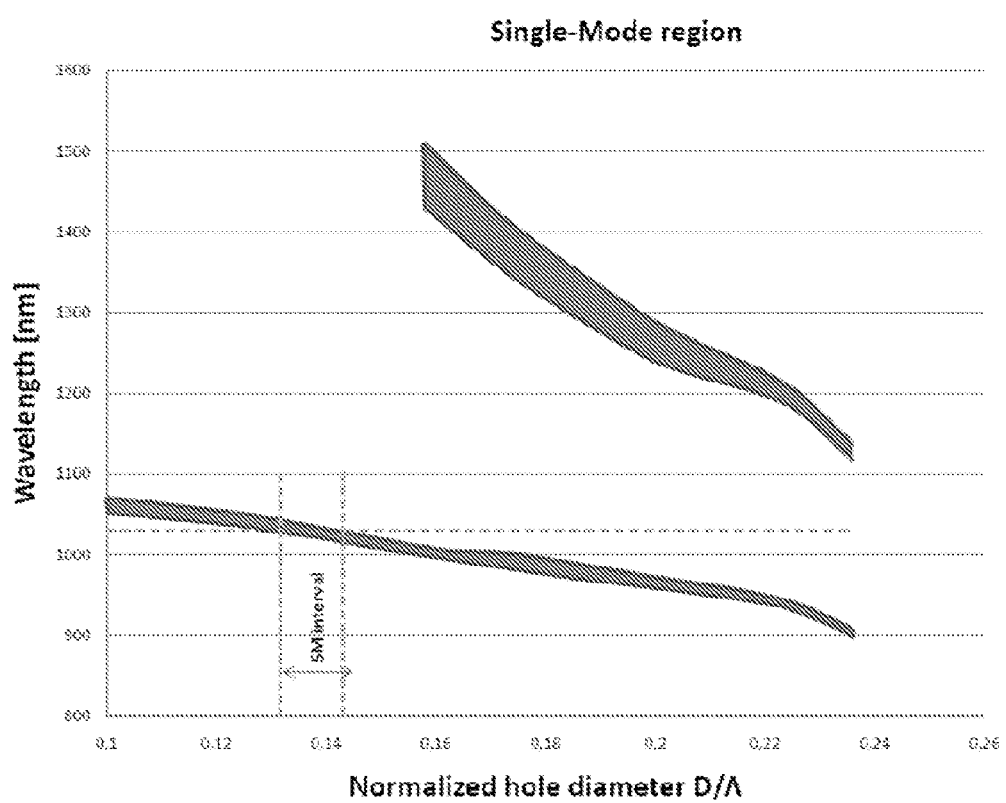
FIG. 9 shows a calculated single-mode region of an optical fiber according to the present invention.

FIG. 9 shows measured single-mode regions of the passive honeycomb structure (FIG. 2) for normalized hole diameter of 0.1-0.24. Two single-mode bands are shown, corresponding to two different cladding modes of the plurality of first type of features that couples higher-order modes out of the core. Horizontal line marks 1030 nm as an example of a signal wavelength and vertical lines indicate the hole diameter interval wherein the fiber is single-moded at the signal wavelength.

Figure 10:
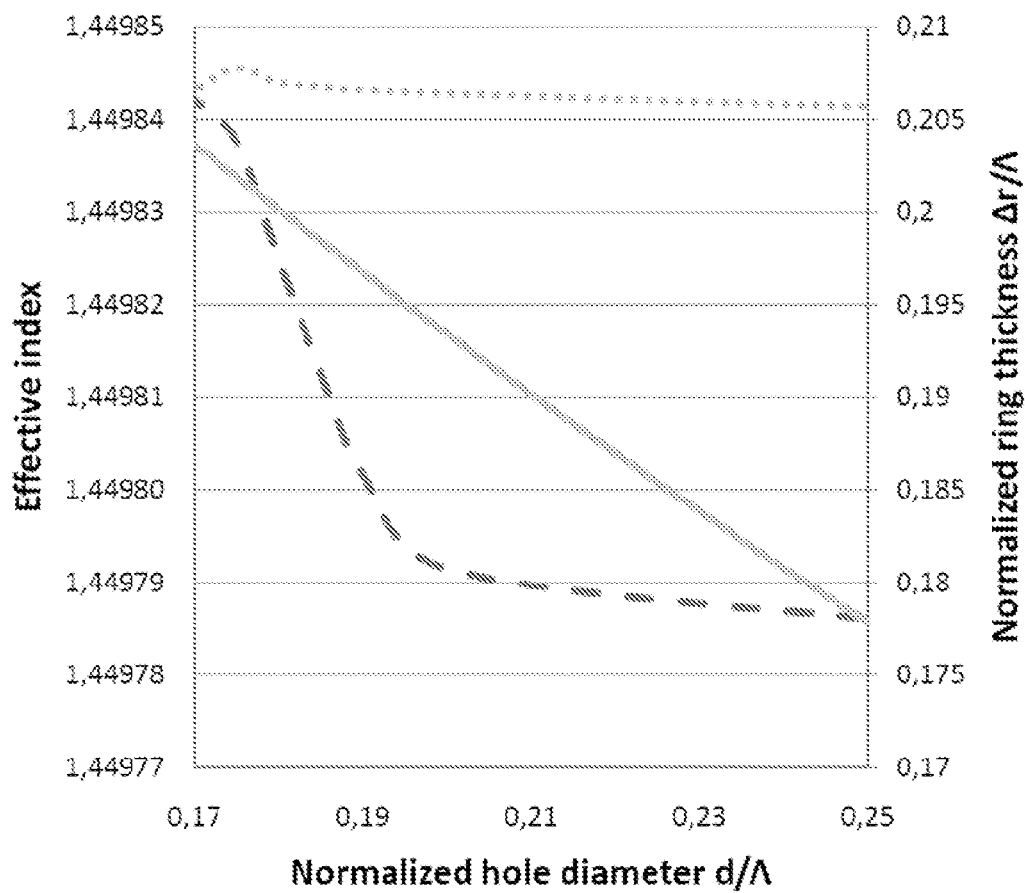
FIG. 10 shows the effective refractive index versus the normalized hole diameter for an optical fiber according to the present invention

FIG. 10 shows simulated mode indices of the fundamental mode (dotted) and first higher-order mode (dashed curve, low slope) of a honeycomb structure (such as the one illustrated in FIG. 2) at 1064 nm wavelength. The fiber structure has a pitch, $\Lambda$, of 14.5 μm and a ring index of $2.5 \cdot 10^{-3}$ above silica. At large hole diameters, the fiber is multimoded, but as the hole diameter, d, is reduced, the normalized ring thickness goes up and increases the effective refractive index of the cladding modes and couples the higher-order mode out of the core from $d/\Lambda=0.17$ to 0.19 (steep dashed line). At $d/\Lambda<0.17$ the fundamental core mode is not guided. Also shown is the normalized ring thickness as function of hole diameter (assuming mass conservation of the high index material).

Figure 11:
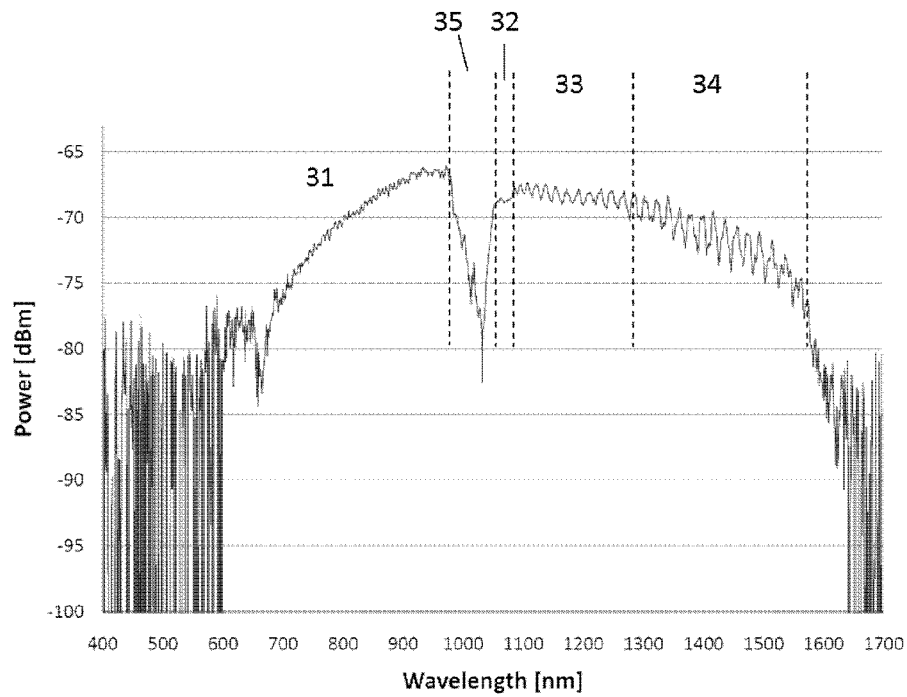
FIG. 11 shows a measured transmission spectrum of an optical fiber according to the present invention.
Figure 12:
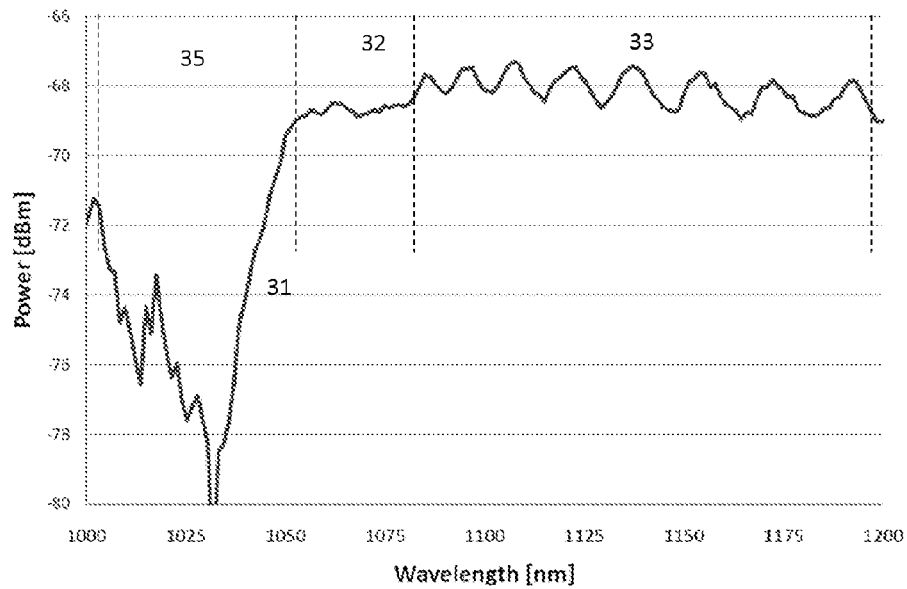
FIG. 12 shows a close-up of the transmission spectrum of FIG. 11, zooming in on the wavelength range from 1000 nm to 1200 nm.

FIGS. 11 and 12 show transmission spectra 31 of the passive honeycomb-like or kagome structure with overlaid beat spectrum from the beating between the fundamental mode and the higher-order core modes. No oscillations are observed around 1050 nm-1070 nm, which indicate that the fiber is single-moded in this wavelength band 32. The core modes are not or only weakly guided at wavelengths 970 nm-1050 nm, which indicate that the cladding mode crosses the fundamental core mode and couples it out of the core in this wavelength band 35. This stop band could suppress short-wavelength Amplified Spontaneous Emission. In FIG. 12, oscillations are observed at wavelength larger than 1070 nm, which indicate the onset of multimode behavior. The core modes are not or only weakly guided below 1050 nm wavelength, which indicate that the cladding mode crosses the fundamental core mode and couples it out of the core.

The invention claimed is:

1. A single-mode optical fiber for guiding an optical signal, said optical fiber having a longitudinal, optical axis and a cross section perpendicular thereto, said optical fiber comprising:

a core region being capable of guiding an optical signal in a fundamental core mode with an effective refractive index, $n_c$, at an optical signal wavelength, $\lambda_1$;

a cladding region surrounding the core region, the cladding region comprising an inner cladding region and an outer cladding region, said inner cladding region comprising a background material having a refractive index, $n_b$, and a plurality of inner cladding features arranged in said background material, wherein at least a plurality of said plurality of inner cladding features are of a first type of feature, said first type of feature comprising an air hole surrounded by a high-index region comprising a high-index material having a refractive index, $n_r$, that is larger than the refractive index of the inner cladding background material, said first type of feature supports an optical mode with an effective refractive index, $n_1$, which is lower than or equal to the effective refractive index of the fundamental core mode, $n_c$, at said optical signal wavelength, $\lambda_1$, wherein said core region has a maximum cross-sectional dimension of more than about 40 μm, and wherein the index difference between the high-index material and the background material of the inner cladding is below about $1 \cdot 10^{-2}$.

2. The optical fiber according to claim 1, wherein said plurality of inner cladding features further comprises a second type of feature comprising an air hole in direct contact with the background material having a refractive index, $n_b$.

3. The optical fiber according to claim 1, wherein said plurality of inner cladding features are substantially round.

4. The optical fiber according to claim 1, the fiber being capable of being cladding pumped or core pumped and being adapted for amplifying an optical signal, the core region comprising a material doped with at least one active element; and the inner cladding region being capable of guiding a pump signal at a pump wavelength, $\lambda_p$.

5. The optical fiber according to claim 1, wherein the core region has a core effective refractive index, the core effective refractive index being substantially equal to the refractive index of the inner cladding background material.

6. The optical fiber according to claim 4, wherein the material doped with an active element is substantially arranged in an active part of said core region, said active part surrounding a central part of said core region, such as said active part being substantially formed by a cross sectional annular region surrounding the central part of the core region and wherein said active part is arranged so that the fundamental core mode has a modal field overlap with the active part, which is below about 50%.

7. The optical fiber according to claim 1, wherein said core region is doped with one or more materials selected from the group of Fluorine (F), Germanium (Ge), and Cerium (Ce), or combinations of these.

8. The optical fiber according to claim 1, wherein said inner cladding features are arranged in a substantially periodic lattice with periodicity, $\lambda$, and wherein the periodicity, $\lambda$, of said lattice is such that the ratio $\lambda/2$ is more than about 5.

9. The optical fiber according to claim 8, wherein said inner cladding features are arranged in a substantially hexagonal lattice.

10. The optical fiber according to claim 8, wherein a diameter, $d_1$, of said air hole of said first type of feature is such that the $d_1/\Lambda$ ratio is below about 0.3.

11. The optical fiber according to claim 1, wherein said high-index region of said first type of feature comprises germanium doped silica.

12. The optical fiber according to claim 2, wherein said inner cladding features are arranged in a substantially hexagonal lattice and the six nearest neighbors surrounding a first type of feature are of said second type.

13. The optical fiber according to claim 1, wherein said first type of inner cladding feature is capable of supporting an optical mode, which at the optical signal wavelength, $\lambda_1$, has an effective refractive index that is smaller than the effective refractive index of the fundamental core mode; and which at a range of wavelengths shorter than the optical signal wavelength, $\lambda_1$, has an effective refractive index that is larger than or equal to the effective refractive index of the fundamental core mode.

14. The optical fiber according to claim 1, wherein said fiber is a rod fiber.

15. A cladding pumped optical fiber for amplifying an optical signal, said optical fiber having a longitudinal, optical axis and a cross section perpendicular thereto, said optical fiber comprising:
- a core region comprising a material doped with at least one active element; said core region being capable of guiding an optical signal in a fundamental core mode with an effective refractive index, $n_c$, at an optical signal wavelength, $\lambda_1$;
- a cladding region surrounding the core region, the cladding region comprising an inner cladding region and an outer cladding region, the inner cladding region being capable of guiding a pump signal at a pump wavelength, $\lambda_p$, said inner cladding region comprising a background material having a refractive index, $n_b$, and a plurality of inner cladding features arranged in said background material, wherein at least a plurality of said plurality of inner cladding features are of a first type of feature, said first type of feature comprising an air hole surrounded by a high-index region comprising a high-index material having a refractive index, $n_r$, that is larger than the refractive index of the inner cladding background material, said plurality of said first type of inner cladding feature being arranged to provide at least one cladding mode that suppresses higher order core modes.

16. A method for producing an optical fiber, said method comprising:
- I. providing at least one core preform element, and a plurality of inner cladding preform elements;
- II. arranging said core preform element and said inner cladding preform elements in a preform such that said inner cladding preform elements surround said core preform element, and optionally arranging a plurality of outer cladding preform elements and/or an outer cladding preform tube to surround the core preform element and the inner cladding preform elements;
- III. drawing said preform to an optical fiber;
  wherein said inner cladding preform elements comprise a plurality of a first type of preform elements comprising an air hole surrounded by a region with a higher index of refraction than the outer cladding preform elements.

17. An optical amplifier system for amplifying an optical signal at an optical signal wavelength, $\lambda_1$, said system comprising
- i. a single mode cladding pumped optical fiber according to claim 1;
- ii. a pump light source capable of providing pump light at a pump wavelength, $\lambda_p$, said pump light source being optically coupled to said cladding pumped optical fiber; and
- iii. a seed light source arranged to emit an optical signal into the core of said cladding pumped optical fiber.

* * * * *